US008247716B2

(12) United States Patent
Weister et al.

(10) Patent No.: US 8,247,716 B2
(45) Date of Patent: Aug. 21, 2012

(54) ELECTRICAL SWITCHING APPARATUS, AND LEVERING ASSEMBLY AND POSITION INDICATOR ASSEMBLY THEREFOR

(75) Inventors: Nathan J. Weister, Darlington, PA (US); Erik R. Bogdon, Carnegie, PA (US); Craig A. Rodgers, Imperial, PA (US)

(73) Assignee: Eaton Corporation, Cleveland, OH (US)

( * ) Notice: Subject to any disclaimer, the term of this patent is extended or adjusted under 35 U.S.C. 154(b) by 232 days.

(21) Appl. No.: 12/777,638

(22) Filed: May 11, 2010

(65) Prior Publication Data

US 2011/0278141 A1 Nov. 17, 2011

(51) Int. Cl.
*H01H 9/20* (2006.01)
(52) U.S. Cl. .................. 200/50.26; 200/50.24
(58) Field of Classification Search ............... 200/50.24, 200/50.17, 50.21, 50.26
See application file for complete search history.

(56) References Cited

U.S. PATENT DOCUMENTS

| | | | |
|---|---|---|---|
| 4,012,610 A | 3/1977 | Ericson et al. | |
| 6,005,208 A | 12/1999 | Castonguay | |
| 6,160,229 A | 12/2000 | Grelier et al. | |
| 7,019,229 B1 | 3/2006 | Weister et al. | |
| 7,485,817 B2 | 2/2009 | Gottschalk | |
| 7,486,499 B2 | 2/2009 | Rambo et al. | |
| 7,847,203 B2 * | 12/2010 | Narayanan et al. | 200/50.26 |
| 2001/0022263 A1 * | 9/2001 | Letient | 200/50.26 |
| 2012/0067707 A1 * | 3/2012 | Pollitt et al. | 200/50.24 |

FOREIGN PATENT DOCUMENTS

EP 2 110 905 A2 10/2009

OTHER PUBLICATIONS

European Patent Office, "extended European search report", Jun. 8, 2012, 7 pp.

* cited by examiner

*Primary Examiner* — Vanessa Girardi
(74) *Attorney, Agent, or Firm* — Dawn C. Wolff; Martin J. Moran (57) ABSTRACT

A position indicator assembly is provided for a levering assembly of an electrical switching apparatus, such as a circuit breaker. The levering assembly includes a drive shaft and a racking member movably coupled to the circuit breaker housing. The drive shaft cooperates with the racking member to facilitate racking the circuit breaker into and out of a cassette. The position indicator assembly includes a number of indicator gears cooperating with the drive shaft, an indication rack cooperating with the indicator gears, and an indicator cooperating with the indication rack to provide a visual indication indicative of the position of the circuit breaker with respect to the cassette. When the circuit breaker is moved with respect to the cassette, the drive shaft pivots. In response, the indicator gears move, thereby moving the indication rack and the indicator in order to provide the visual indication.

20 Claims, 7 Drawing Sheets

ELECTRICAL SWITCHING APPARATUS, AND LEVERING ASSEMBLY AND POSITION INDICATOR ASSEMBLY THEREFOR

BACKGROUND

1. Field

The disclosed concept relates generally to electrical switching apparatus and, more particularly, to electrical switching apparatus, such as circuit breakers. The disclosed concept also relates to levering assemblies and to position indicator assemblies for circuit breakers.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of the switchgear enclosure. Accordingly, such circuit breakers are commonly known in the art as "draw-out" circuit breakers. The circuit breaker may be further supported within a draw-out frame, commonly known in the art as a cassette or chassis. The switchgear enclosure generally includes a number of cells, with each cell being structured to receive a corresponding circuit breaker. The draw-out mechanism includes, for example, a combination of rails and rollers coupled to one or the other, or both, of the sidewalls of the cell and the sides of the corresponding circuit breaker and/or cassette, which is to be drawn into and out of the cell. A levering in assembly (sometimes referred to as a "lev-in" device), which among other components includes a drive screw and drive rack, facilitates levering the circuit breaker into the cassette. Draw-out circuit breakers are described in further detail, for example, in commonly assigned U.S. Pat. No. 7,019,229, which is hereby incorporated herein by reference.

When a draw-out circuit breaker is being levered into a cassette, proper position or travel indication must be displayed. For example, such indication is both required for safety, and used for interlocking of the circuit breaker mechanism and lev-in device. Some lev-in devices include a position indicator for this purpose. However, among other disadvantages, the motion associated with providing the indication is not constant. For example and without limitation, mechanical drive of the position indicator is intermittent, in view of the use of partial gear teeth, cams and/or slots.

There is, therefore, room for improvement in electrical switching apparatus, such as circuit breakers, and in levering assemblies and position indicator assemblies therefor.

SUMMARY

These needs and others are met by embodiments of the disclosed concept, which are directed to a position indicator assembly for a levering assembly of an electrical switching apparatus, such as a circuit breaker. Among other benefits, the position indicator assembly provides complete and uninterrupted mechanical indication of the position of the circuit breaker when it is being levered into a corresponding cassette.

As one aspect of the disclosed concept, a position indicator assembly is provided for a levering assembly of an electrical switching apparatus. The electrical switching apparatus includes a housing. The levering assembly comprises a drive shaft and a racking member movably coupled to the housing. The drive shaft cooperates with the racking member to facilitate racking of the electrical switching apparatus into and out of a cassette. The position indicator assembly comprises: a number of indicator gears structured to cooperate with the drive shaft; an indication rack cooperating with at least one of the number of indicator gears; and an indicator structured to cooperate with the indication rack to provide a visual indication indicative of the position of the electrical switching apparatus with respect to the cassette. When the electrical switching apparatus is moved with respect to the cassette, the drive shaft pivots. When the drive shaft pivots, the indicator gears are structured to move, thereby moving the indication rack and the indicator in order to provide the visual indication.

The indication rack may be an elongated member comprising a first end and a second end disposed opposite and distal from the first end, and the number of indicator gears may comprise a first indicator gear and a second indicator gear. The first indicator gear may be structured to be disposed on the drive shaft, and the second indicator gear may be structured to cooperate with the first indicator gear and the first end of the indication rack. The first indicator gear may include a plurality of teeth, and the indication rack may further comprise a plurality of grooves disposed at or about the first end of the indication rack, and a plurality of grooves disposed at or about the second end of the indication rack. The second indicator gear may include a first portion having a first diameter and a plurality of teeth, and a second portion having a second diameter and a plurality of teeth, wherein the first diameter is greater than the second diameter. The teeth of the first portion may cooperate with the teeth of the first indicator gear. The teeth of the second portion may be structured to cooperate with the grooves of the first end of the indication rack to move the indication rack toward and away from the drive shaft. The number of indicator gears may further comprise a third indicator gear, wherein the third indicator gear includes a plurality of teeth cooperating with the grooves of the second end of the indication rack. The indicator may comprise a plurality of teeth, wherein the teeth of the third indicator gear cooperate with the teeth of the indicator. When the indication rack moves, the third indicator gear may pivot, thereby moving the indicator to provide the visual indication indicative of the position of the electrical switching apparatus with respect to the cassette. The second indicator gear may be an idler gear, and the third indicator gear may be a reverser gear, wherein the idler gear and the reverser gear are structured to provide a gear reduction in order to reduce the amount the indicator moves for a given corresponding movement of the drive shaft.

As another aspect of the disclosed concept, a levering assembly is provided for an electrical switching apparatus. The electrical switching apparatus may be structured to be removably disposed in a cassette, and may include a housing. The levering assembly comprises: a drive shaft; a racking member movably coupled to the housing, the drive shaft being structured to cooperate with the racking member to rack the electrical switching apparatus into and out of the cassette; and a position indicator assembly comprising: a number of indicator gears cooperating with the drive shaft, an indication rack cooperating with at least one of the number of indicator gears, and an indicator structured to cooperate with the indication rack to provide a visual indication indicative of the position of the electrical switching apparatus with respect to the cassette. When the electrical switching apparatus is moved with respect to the cassette, the drive shaft pivots.

When the drive shaft pivots, the indicator gears move, thereby moving the indication rack and the indicator in order to provide the visual indication.

As a further aspect of the disclosed concept, an electrical switching apparatus comprises: a housing; and a levering assembly comprising: a drive shaft, a racking member movably coupled to the housing, the drive shaft being structured to cooperate with the racking member to rack the electrical switching apparatus into and out of a cassette, and a position indicator assembly comprising: a number of indicator gears cooperating with the drive shaft, an indication rack cooperating with at least one of the number of indicator gears, and an indicator structured to cooperate with the indication rack to provide a visual indication indicative of the position of the electrical switching apparatus with respect to the cassette. When the electrical switching apparatus is moved with respect to the cassette, the drive shaft pivots. When the drive shaft pivots, the indicator gears move, thereby moving the indication rack and the indicator in order to provide the visual indication.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, front, back, top, bottom, clockwise, counterclockwise and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 1:
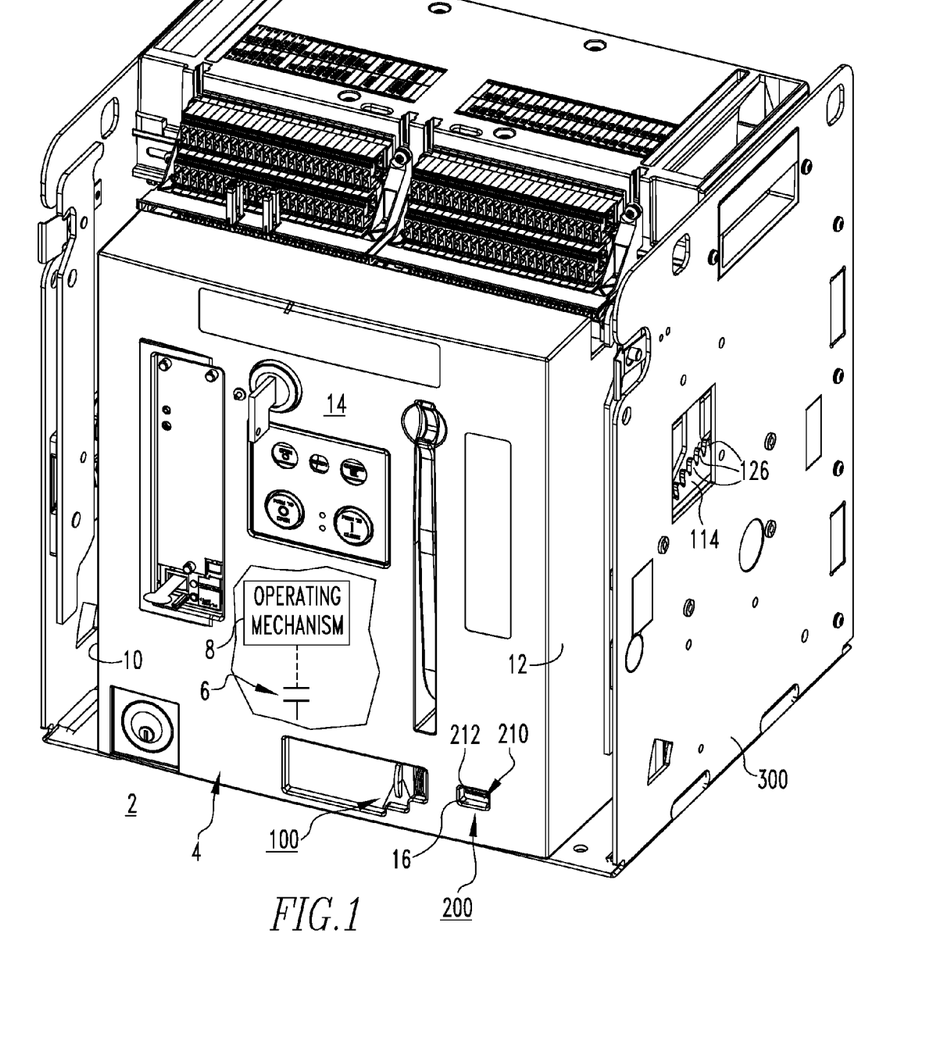
FIG. 1 is an isometric view of a circuit breaker, and levering assembly and position indicator assembly therefor, in accordance with an embodiment of the disclosed concept.

FIG. 1 shows a non-limiting example of a an electrical switching apparatus, such as a circuit breaker 2, with which a levering assembly 100 and position indicator assembly 200 therefor, in accordance with the disclosed concept, can be employed. The circuit breaker 2 includes a housing 4, separable contacts 6 (shown in simplified form) enclosed by the housing 4, and an operating mechanism 8 (shown in simplified form) for opening and closing the separable contacts 6. In the example of FIG. 1, the circuit breaker housing 4 includes first and second opposing sides 10,12 and a cover 14 extending therebetween. The cover 14 includes a window 16 through which an indicator 210 and a visual indication 212 of the position indicator assembly 200 can be seen. For example and without limitation in FIG. 1, a visual indication in the form of a "connect" label 212 is visible in the window 16. As will be described in greater detail hereinbelow, it will be appreciated that the circuit breaker 2 is removably disposed in a cassette 300. That is, the circuit breaker 2 can be racked or levered into and out of the cassette 300 by way of the levering assembly 100.

More specifically, as shown in FIGS. 2-10, the levering assembly 100 includes a drive shaft 112, and at least one racking member 114 movably coupled to the circuit breaker housing 4 (FIG. 1). One racking member 114 is shown and described herein, for economy of disclosure and simplicity of illustration. It will be appreciated, however, that a second racking member (not shown), for example and without limitation which is disposed opposite and distal from racking member 114, could be employed without departing from the scope of the disclosed concept. The drive shaft 112 cooperates with the racking member 114 to facilitate racking of the circuit breaker 2 into and out of the cassette 300.

In the non-limiting example embodiment shown and described herein, the levering assembly 100 further includes a mounting member 102 to which the aforementioned drive shaft 112 is pivotably coupled. As shown, for example in FIG. 2, the mounting member 102 includes first and second opposing sides 104,106 and first and second opposing edges 108, 110. A drive screw 116, which can preferably be accessed through a corresponding opening in the circuit breaker cover 14 (FIG. 1), extends from at or about the first side 104 toward the second side 106. The levering assembly 100 further includes a drive rack 118, and a drive gear 120. The drive gear 120 is preferably disposed on the drive shaft 112 between the first and second ends 122,124 thereof. The first end 122 of the example drive shaft 112 extends outwardly from the first edge 108 of the mounting member 102, and the second end 124 extends outwardly from the second edge 110. A racking gear 128,130 is disposed on at least one of the ends 122,124. In the example shown, a first racking gear 128 is disposed on the first end 122 of the drive shaft 112, and a second racking gear 130 is disposed on the second end 124.

The drive screw 116 includes a plurality of threads 136, the drive rack 118 includes a plurality of grooves 138, and the drive gear 120 includes a plurality of teeth 140. Therefore, in operation, when the drive screw 116 is pivoted (e.g., without limitation, rotated clockwise or counterclockwise from the perspective of FIG. 2) the threads 136 of the drive screw 116 cooperate with the grooves 138 of the drive rack 118, to move the drive rack 118 with respect to the drive gear 120. When the drive rack 118 moves (e.g., without limitation, toward and away from the drive shaft 112), the grooves 138 of the drive rack 118 cooperate with the teeth 140 of the drive gear 120 to pivot the drive gear 120 and thereby correspondingly pivot the drive shaft 112.

The exemplary position indicator assembly 200 for the levering assembly 100, will now be described in greater detail. Specifically, the position indicator assembly 200 includes a number of indicator gears 202,204,206, which are structured to cooperate with the drive shaft 112. An indication rack 208 cooperates with at least one of the indicator gears 202,204,206, as will be described in greater detail hereinbelow. In turn, an indicator 210 cooperates with the indication rack 208 to provide a visual indication 212,214,216 (e.g., without limitation, the word "connect" 212 (FIGS. 1 and 2), the word "disconnect" 214 (FIG. 5), or the word "test" 116 (FIG. 8) displayed at window 16 (FIG. 1) of circuit breaker cover 14 (FIG. 1)), which is indicative of the position of the circuit breaker 2 (FIG. 1) with respect to the cassette 300 (FIG. 1). Accordingly, when the circuit breaker 2 (FIG. 1) is moved (e.g., without limitation, racked into or out of) with respect to the cassette 300 (FIG. 1) the drive shaft 112 pivots. When the drive shaft 112 pivots, the indicator gears 202,204, 206 (three are shown) move, thereby moving the indication rack 208 and the indicator 210 to provide the aforementioned visual indication 212,214,216.

Figure 2:
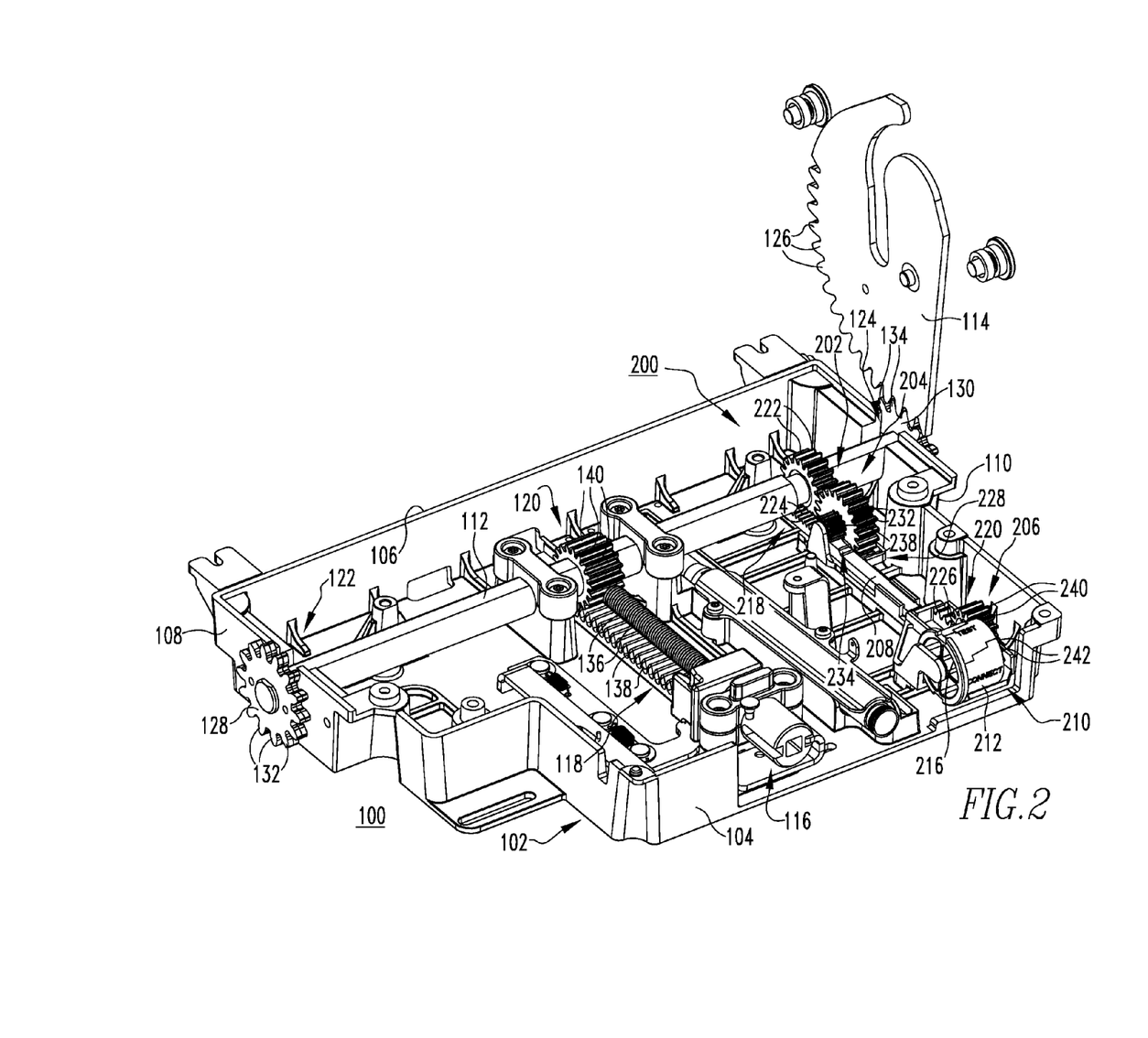
FIG. 2 is an isometric view of a levering assembly and position indicator assembly therefor, in accordance with an embodiment of the disclosed concept, shown in the "connect" configuration.
Figure 3:
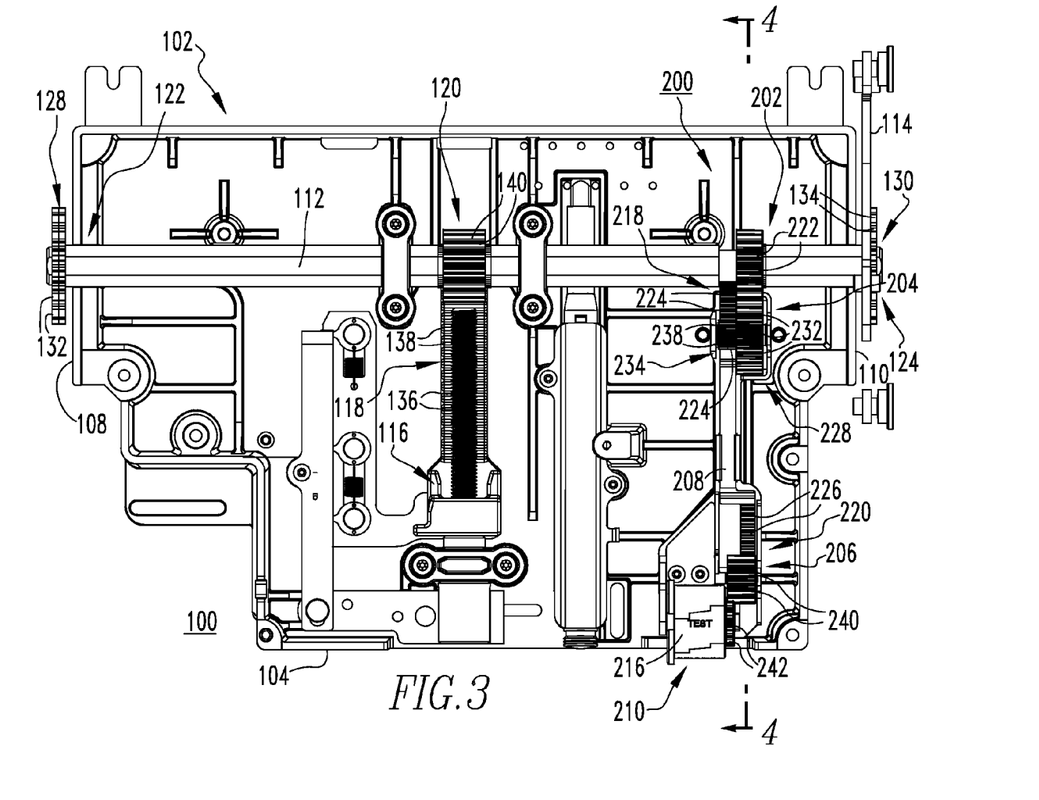
FIG. 3 is a top plan view of the levering assembly and position indicator assembly therefor of FIG. 2.
Figure 4:
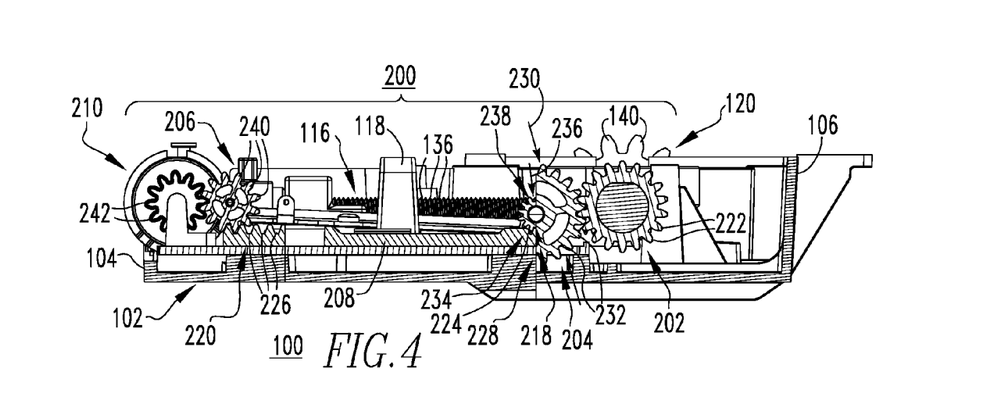
FIG. 4 is a section view taken along line 4-4 of FIG. 3.

Continuing to refer to FIG. 2, and also to FIGS. 3 and 4, it will be appreciated that the indication rack is an elongated member 208, having first and second opposing ends 218,220. In the example shown and described herein, the position indicator assembly 200 includes three indicator gears 202, 204,206, although it will be appreciated that any known or suitable alternative number and/or configuration of indicator gears could be employed. Preferably, a first indicator gear 202 is disposed on the drive shaft 112 proximate the second end 124 thereof. A second indicator gear 204 cooperates with the first indicator gear 202, and with the first end 218 of the indication rack 208. More specifically, the first indicator gear 202 includes a plurality of teeth 222, and the indication rack 208 includes a plurality of grooves 224 disposed at or about the first end 218 of the indication rack 208, and a plurality of grooves 226 disposed at or about the second end 220 of the indication rack 208. The second indicator gear 204 includes a first portion 228 having a first diameter 230 (FIG. 4) and a plurality of teeth 232, and a second portion 234 having a second diameter 236 (FIG. 4) and a plurality of teeth 238. As shown in FIG. 4, the first diameter 230 is greater than the second diameter 236. It will be appreciated that only half of the first portion 228 is shown in the sectional views of FIGS. 4, 7 and 10, in order to see part of the second portion 234 which would otherwise be hidden. In operation, the teeth 232 of the first portion 228 of second indicator gear 204 cooperate with the teeth 222 of the first indicator gear 202, and the teeth 238 of the second portion 234 of second indicator gear 204 cooperate with the grooves 224 of the first end 218 of the indication rack 208 to move the indication rack 208 toward and away from the drive shaft 112.

Figure 8:
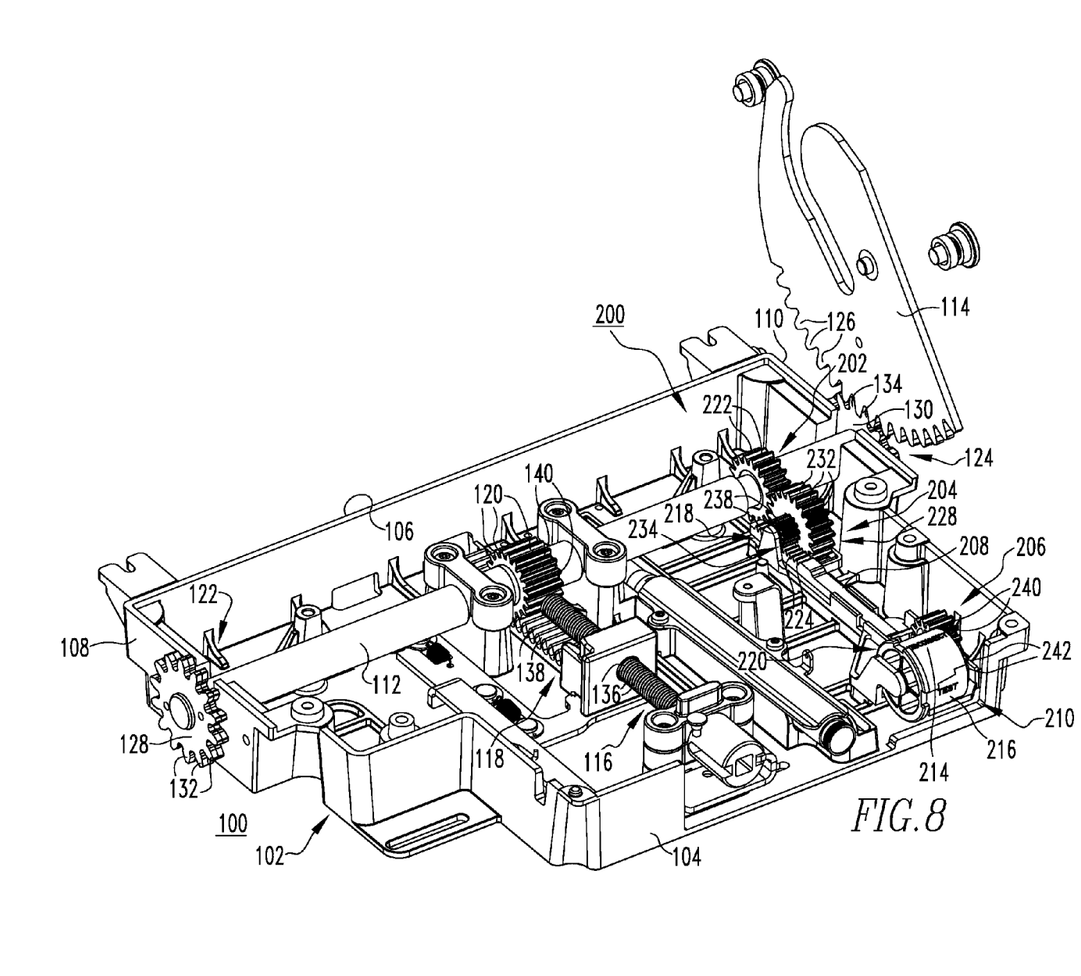
FIG. 8 is an isometric view of the levering assembly and position indicator assembly therefor of FIG. 7, shown in the "test" configuration.

The third indicator gear 206 also includes a plurality of teeth 240, which cooperate with the grooves 226 of the second end 220 of the indication rack 208. As shown in FIGS. 3 and 4, the indicator 210 preferably also includes a plurality of teeth 242. Accordingly, in operation, the teeth 240 of the third indicator gear 206 cooperate with the teeth 242 of the indicator 210 such that, when the indication rack 208 moves, the third indicator gear 206 pivots, thereby moving the indicator 210 to provide the desired visual indication 212 (FIGS. 1 and 2), 214 (FIGS. 5, 8 and 9) 216 (FIGS. 2 and 8).

The example indicator is a pivotable indicator drum 210 having a plurality of labels (e.g., without limitation, "connect;" "disconnect;" "test") to provide the desired visual indication 212,214,216 indicative of the corresponding one of a plurality of different positions of the circuit breaker 2 (FIG. 1) with respect to the cassette 300 (FIG. 1). The example second indicator gear 204 is an idler gear, and the example third indicator gear 206 is a reverser gear. In the example shown and described herein, the idler gear 204 and reverser gear 206 preferably provide a gear reduction to suitably reduce the amount by which the indicator 210 moves for a given corresponding movement of the drive shaft 112. It will be appreciated, however, that any known or suitable alternative number, type and/or configuration of gears (e.g., without limitation, 202,204,206) could be employed, for example, to provide a suitable increase in motion, or unchanged (e.g., direct transmission of) motion, as desired, without departing from the scope of the disclosed concept.

Accordingly, it will be appreciated that the position indicating assembly 200 provides an uninterrupted positive mechanical position indication mechanism for accurately indicating the status of the circuit breaker 2 (FIG. 1) to the operator.

The mechanical interaction between the levering assembly 100 and the position indicator assembly 200 will now be described in greater detail. Specifically, each of the aforementioned racking members 114 of the levering assembly 100 includes a plurality of teeth 126. Such teeth 126 cooperate with the teeth 134 of the corresponding racking gear 130, which is coupled to the drive shaft 112. Specifically, the example levering assembly 100 includes first and second racking gears 128,130 having teeth 132,134 and being disposed on opposing ends 122,124, respectively, of the drive shaft 112, as previously discussed. Accordingly, when the circuit breaker 2 (FIG. 1) is racked into and/or out of the cassette 300 (FIG. 1) the interaction of the teeth 126 of the racking member 114 with the teeth 134 of the corresponding racking gear 130 results in a corresponding pivoting motion of the drive shaft 112. This, in turn actuates the disclosed position indicator assembly 200 such that a direct mechanical linkage and corresponding visual indication 212,214,216 indicative of the circuit breaker status (e.g., without limitation, position) with respect to the cassette 300 (FIG. 1), is provided. See, for example and without limitation, "connect" visual indication 212 at window 16 of circuit breaker cover 14 in the example of FIG. 1.

Figure 5:
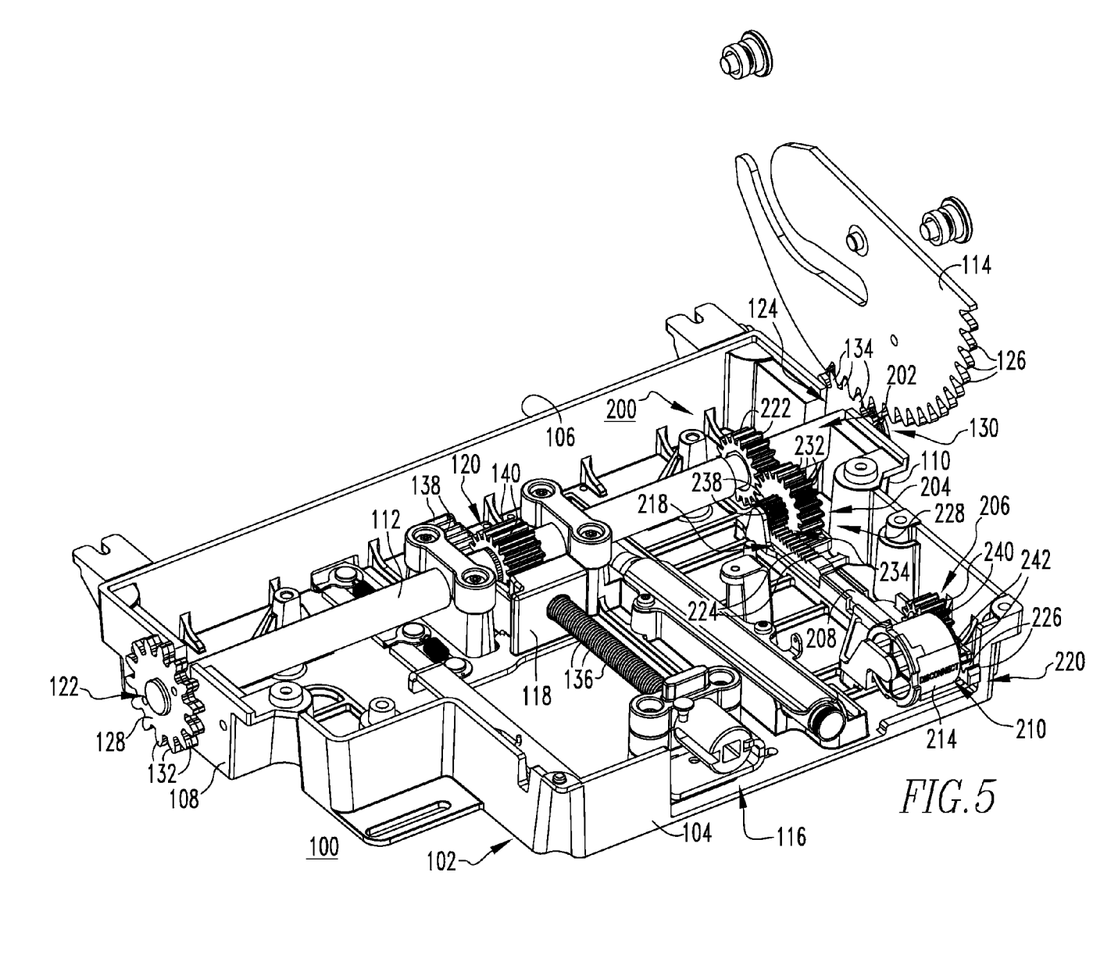
FIG. 5 is an isometric view of the levering assembly and position indicator assembly therefor of FIG. 4, shown in the "disconnect" configuration.
Figures 6, 7:
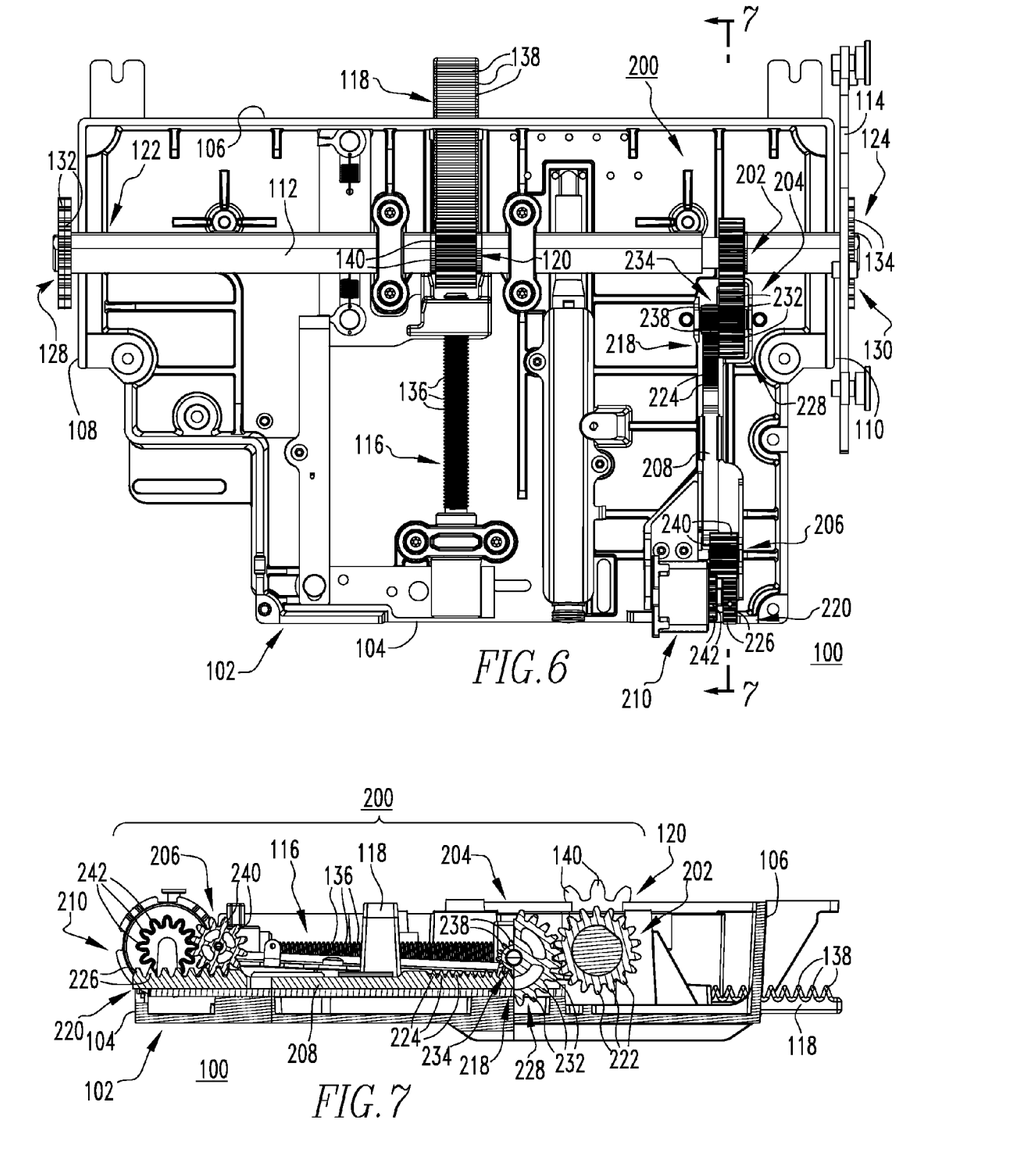
FIG. 6 is a top plan view of the levering assembly and position indicator assembly therefor of FIG. 5.
FIG. 7 is a section view taken along line 7-7 of FIG. 6.
Figure 9:
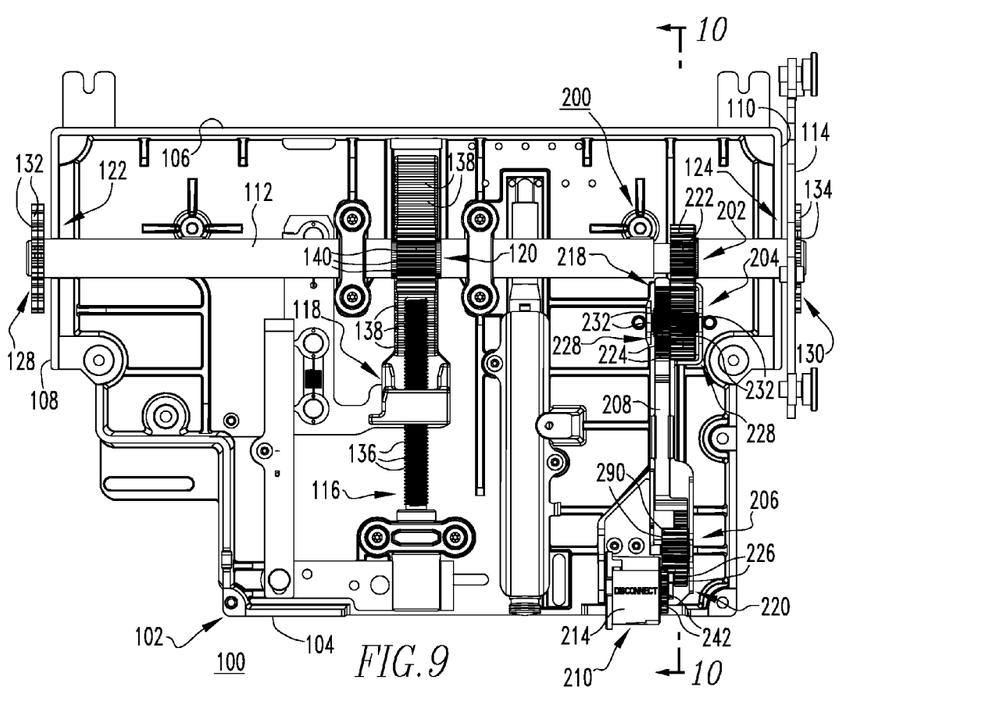
FIG. 9 is a top plan view of the levering assembly and position indicator assembly therefor of FIG. 8.
Figure 10:
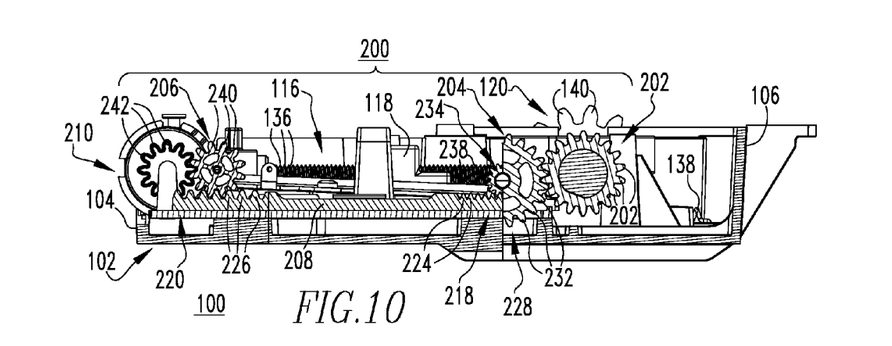
FIG. 10 is a section view taken along line 10-10 of FIG. 9.

Three different configurations and corresponding visual indications 212,214,216 of the levering assembly 100 and position indicator assembly 200, are shown herein. It will be appreciated, however, that any known or suitable alternative number, type and/or configuration of levering assembly 100 and/or position indicator assembly 200 configurations and/or visual indications are contemplated by the disclosed concept. For example and without limitation, FIGS. 1-4 illustrate one non-limiting example embodiment in which the position indicator assembly 200 is configured to provide a "connect" visual indication 212, FIGS. 5-7 illustrate a configuration of the levering assembly 100 and position indicator assembly 200 in which the indicator 210 provides a "disconnect" visual indication 214, and FIGS. 8-10 illustrate a configuration of the levering assembly 100 and position indicator assembly 200 corresponding to the indicator 210 providing a "test" visual indication 216. In each case, the visual indication 212 (FIGS. 1-4), 214 (FIGS. 5-7), 216 (FIGS. 8-10) provides an accurate positive indication of the circuit breaker status (e.g., without limitation, position) with respect to the cassette 300 (FIG. 1).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A position indicator assembly for a levering assembly of an electrical switching apparatus, said electrical switching apparatus including a housing, said levering assembly comprising a drive shaft and a racking member movably coupled to the housing, said drive shaft cooperating with said racking member to facilitate racking of said electrical switching apparatus into and out of a cassette, said position indicator assembly comprising:
   a number of indicator gears structured to cooperate with said drive shaft;
   an indication rack cooperating with at least one of said number of indicator gears; and
   an indicator structured to cooperate with said indication rack to provide a visual indication indicative of the position of said electrical switching apparatus with respect to said cassette,
   wherein, when said electrical switching apparatus is moved with respect to said cassette, said drive shaft pivots, and
   wherein, when said drive shaft pivots, said indicator gears are structured to move, thereby moving said indication rack and said indicator in order to provide said visual indication.

2. The position indicator assembly of claim 1 wherein said indication rack is an elongated member comprising a first end and a second end disposed opposite and distal from the first end; wherein said number of indicator gears comprises a first indicator gear and a second indicator gear; wherein said first indicator gear is structured to be disposed on said drive shaft; and wherein said second indicator gear is structured to cooperate with said first indicator gear and the first end of said indication rack.

3. The position indicator assembly of claim 2 wherein said first indicator gear includes a plurality of teeth; wherein said indication rack further comprises a plurality of grooves disposed at or about the first end of said indication rack, and a plurality of grooves disposed at or about the second end of said indication rack; wherein said second indicator gear includes a first portion having a first diameter and a plurality of teeth, and a second portion having a second diameter and a plurality of teeth; wherein the first diameter is greater than the second diameter; wherein the teeth of said first portion cooperate with the teeth of said first indicator gear; and wherein the teeth of said second portion are structured to cooperate with the grooves of the first end of said indication rack to move said indication rack toward and away from said drive shaft.

4. The position indicator assembly of claim 3 wherein said number of indicator gears further comprises a third indicator gear; wherein said third indicator gear includes a plurality of teeth cooperating with the grooves of the second end of said indication rack; wherein said indicator comprises a plurality of teeth; wherein the teeth of said third indicator gear cooperate with the teeth of said indicator; and wherein, when said indication rack moves, said third indicator gear pivots, thereby moving said indicator to provide said visual indication indicative of the position of said electrical switching apparatus with respect to said cassette.

5. The position indicator assembly of claim 4 wherein said indicator is a pivotable indicator drum; wherein said pivotable indicator drum further comprises a plurality of labels; and wherein each of said labels provides a different visual indication indicative of a corresponding one of a plurality of different positions of said electrical switching apparatus with respect to said cassette.

6. The position indicator assembly of claim 4 wherein said second indicator gear is an idler gear; wherein said third indicator gear is a reverser gear; and wherein said idler gear and said reverser gear are structured to provide a gear reduction in order to reduce the amount said indicator moves for a given corresponding movement of said drive shaft.

7. A levering assembly for an electrical switching apparatus structured to be removably disposed in a cassette, said electrical switching apparatus including a housing, said levering assembly comprising:
   a drive shaft;
   a racking member movably coupled to the housing, said drive shaft being structured to cooperate with said racking member to rack said electrical switching apparatus into and out of said cassette; and
   a position indicator assembly comprising:
      a number of indicator gears cooperating with said drive shaft,
      an indication rack cooperating with at least one of said number of indicator gears, and
      an indicator structured to cooperate with said indication rack to provide a visual indication indicative of the position of said electrical switching apparatus with respect to said cassette,
      wherein, when said electrical switching apparatus is moved with respect to said cassette, said drive shaft pivots, and
      wherein, when said drive shaft pivots, said indicator gears move, thereby moving said indication rack and said indicator in order to provide said visual indication.

8. The levering assembly of claim 7 wherein said drive shaft comprises a first end and a second end disposed opposite and distal from the first end; wherein said indication rack of said position indicator assembly is an elongated member comprising a first end and a second end disposed opposite and distal from the first end of said elongated member; wherein said number of indicator gears comprises a first indicator gear and a second indicator gear; wherein said first indicator gear is disposed on said drive shaft proximate the second end of said drive shaft; and wherein said second indicator gear cooperates with said first indicator gear and the first end of said indication rack.

9. The levering assembly of claim 8 wherein said first indicator gear includes a plurality of teeth; wherein said indication rack further comprises a plurality of grooves disposed at or about the first end of said indication rack, and a plurality of grooves disposed at or about the second end of said indication rack; wherein said second indicator gear includes a first portion having a first diameter and a plurality of teeth, and a second portion having a second diameter and a plurality of teeth; wherein the first diameter is greater than the second diameter; wherein the teeth of said first portion cooperate with the teeth of said first indicator gear; and wherein the teeth of said second portion cooperate with the grooves of the first end of said indication rack to move said indication rack toward and away from said drive shaft.

10. The levering assembly of claim 9 wherein said number of indicator gears further comprises a third indicator gear; wherein said third indicator gear includes a plurality of teeth cooperating with the grooves of the second end of said indication rack; wherein said indicator comprises a plurality of teeth; wherein the teeth of said third indicator gear cooperate with the teeth of said indicator; and wherein, when said indication rack moves, said third indicator gear pivots, thereby moving said indicator to provide said visual indication indicative of the position of said electrical switching apparatus with respect to said cassette.

11. The levering assembly of claim 10 wherein said indicator of said position indicator assembly is a pivotable indicator drum; wherein said pivotable indicator drum further comprises a plurality of labels; and wherein each of said labels provides a different visual indication indicative of a corresponding one of a plurality of different positions of said electrical switching apparatus with respect to said cassette.

12. The levering assembly of claim 8 wherein said racking member includes a plurality of teeth; wherein said drive shaft further comprises at least one racking gear including a plurality of teeth; wherein said at least one racking gear is disposed at or about a corresponding one of the first end of said drive shaft and the second end of said drive shaft; and wherein the teeth of said racking member are structured to cooperate with the teeth of a corresponding one of said at least one racking gear, thereby pivoting said drive shaft when said electrical switching apparatus is racked into and out of said cassette.

13. An electrical switching apparatus structured to be removably disposed in a cassette, said electrical switching apparatus comprising:
a housing; and
a levering assembly comprising:
a drive shaft,
a racking member movably coupled to the housing, said drive shaft being structured to cooperate with said racking member to rack said electrical switching apparatus into and out of said cassette, and
a position indicator assembly comprising:
a number of indicator gears cooperating with said drive shaft,
an indication rack cooperating with at least one of said number of indicator gears, and
an indicator structured to cooperate with said indication rack to provide a visual indication indicative of the position of said electrical switching apparatus with respect to said cassette,
wherein, when said electrical switching apparatus is moved with respect to said cassette, said drive shaft pivots, and
wherein, when said drive shaft pivots, said indicator gears move, thereby moving said indication rack and said indicator in order to provide said visual indication.

14. The electrical switching apparatus of claim 13 wherein said drive shaft of said levering assembly comprises a first end and a second end disposed opposite and distal from the first end; wherein said indication rack of said position indicator assembly is an elongated member comprising a first end and a second end disposed opposite and distal from the first end of said elongated member; wherein said number of indicator gears comprises a first indicator gear and a second indicator gear; wherein said first indicator gear is disposed on said drive shaft proximate the second end of said drive shaft; and wherein said second indicator gear cooperates with said first indicator gear and the first end of said indication rack.

15. The electrical switching apparatus of claim 14 wherein said first indicator gear includes a plurality of teeth; wherein said indication rack further comprises a plurality of grooves disposed at or about the first end of said indication rack, and a plurality of grooves disposed at or about the second end of said indication rack; wherein said second indicator gear includes a first portion having a first diameter and a plurality of teeth, and a second portion having a second diameter and a plurality of teeth; wherein the first diameter is greater than the second diameter; wherein the teeth of said first portion cooperate with the teeth of said first indicator gear; and wherein the teeth of said second portion cooperate with the grooves of the first end of said indication rack to move said indication rack toward and away from said drive shaft.

16. The electrical switching apparatus of claim 15 wherein said number of indicator gears of said position indicator assembly further comprises a third indicator gear; wherein said third indicator gear includes a plurality of teeth cooperating with the grooves of the second end of said indication rack; wherein said indicator comprises a plurality of teeth; wherein the teeth of said third indicator gear cooperate with the teeth of said indicator; and wherein, when said indication rack moves, said third indicator gear pivots, thereby moving said indicator to provide said visual indication indicative of the position of said electrical switching apparatus with respect to said cassette.

17. The electrical switching apparatus of claim 16 wherein said indicator of said position indicator assembly is a pivotable indicator drum; wherein said pivotable indicator drum further comprises a plurality of labels; and wherein each of said labels provides a different visual indication indicative of a corresponding one of a plurality of different positions of said electrical switching apparatus with respect to said cassette.

18. The electrical switching apparatus of claim 17 wherein said electrical switching apparatus is a circuit breaker; wherein the housing of said circuit breaker includes a first side, a second side, and a cover extending between the first side and the second side; wherein said racking member is pivotably coupled to a corresponding one of the first side and the second side; wherein said cover includes a window; wherein, when said circuit breaker is moved from one of said positions with respect to said cassette to another different one of said positions with respect to said cassette, said indicator drum moves to display the corresponding one of said labels in said window.

19. The electrical switching apparatus of claim 13 wherein said racking member of said levering assembly includes a plurality of teeth; wherein said drive shaft further comprises at least one racking gear including a plurality of teeth; wherein said at least one racking gear is disposed at or about a corresponding one of the first end of said drive shaft and the second end of said drive shaft; and wherein, when said electrical switching apparatus is racked into and out of said cassette the teeth of said racking member cooperate with the teeth of a corresponding one of said at least one racking gear and said drive shaft pivots.

20. The electrical switching apparatus of claim 19 wherein said levering assembly further comprises a mounting member, a drive screw, a drive rack, and a drive gear; wherein said mounting member includes a first side, a second side disposed opposite and distal from the first side of said mounting member, a first edge, and a second edge disposed opposite and distal from the first edge; wherein said drive screw extends from at or about the first side toward the second side; wherein said drive gear is disposed on said drive shaft between the first end of said drive shaft and the second end of said drive shaft; wherein said drive shaft is pivotably coupled to said mounting member; wherein the first end of said drive shaft extends outwardly from the first edge of said mounting member; wherein the second end of said drive shaft extends outwardly from the second edge of said mounting member; wherein said at least one racking gear is a first racking gear disposed on the first end of said drive shaft and a second racking gear disposed on the second end of said drive shaft; wherein said drive screw includes a plurality of threads; wherein said drive rack includes a plurality of grooves; wherein said drive gear includes a plurality of teeth; wherein, when said drive screw is pivoted, the threads of said drive screw cooperate with the grooves of said drive rack to move said drive rack with respect to said drive gear; and wherein, when said drive rack moves, the grooves of said drive rack cooperate with the teeth of said drive gear, thereby pivoting said drive gear and said drive shaft.

* * * * *